(12) United States Patent
Wei et al.

(10) Patent No.: US 12,056,492 B2
(45) Date of Patent: Aug. 6, 2024

(54) METHOD AND APPARATUS FOR GENERATING DEPENDENCE GRAPH, DEVICE, STORAGE MEDIUM AND PROGRAM PRODUCT

(71) Applicant: Beijing Baidu Netcom Science Technology Co., Ltd., Beijing (CN)

(72) Inventors: Jiaxun Wei, Beijing (CN); Yuxuan Huo, Beijing (CN); Cong Zhang, Beijing (CN); Hui Tang, Beijing (CN); Ze Chen, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 0 days.

(21) Appl. No.: 17/780,940

(22) PCT Filed: Aug. 27, 2021

(86) PCT No.: PCT/CN2021/115006
§ 371 (c)(1),
(2) Date: May 27, 2022

(87) PCT Pub. No.: WO2022/179070
PCT Pub. Date: Sep. 1, 2022

(65) Prior Publication Data
US 2024/0053991 A1    Feb. 15, 2024

(30) Foreign Application Priority Data
Feb. 26, 2021   (CN) .......................... 202110219222.2

(51) Int. Cl.
*G06F 9/38* (2018.01)
*G06F 8/41* (2018.01)
(Continued)

(52) U.S. Cl.
CPC ............ *G06F 9/3838* (2013.01); *G06F 9/541* (2013.01)

(58) Field of Classification Search
CPC ...... G06F 9/3838; G06F 9/541; G06F 9/4484; G06F 8/433; G06F 8/42
See application file for complete search history.

(56) References Cited

U.S. PATENT DOCUMENTS 5,689,711 A      11/1997  Bardasz et al.
2014/0304305 A1* 10/2014  Hui ........................ G06F 16/212
                                                   707/803
(Continued)

FOREIGN PATENT DOCUMENTS

CN       114637891 A  *  6/2002
CN       102054149 A     5/2011
(Continued)

OTHER PUBLICATIONS

English Translation of Japanese Office Action corresponding to Japanese Patent Application No. 2022-520829, dated Jul. 4, 2023 (3 pages).
(Continued)

*Primary Examiner* — Daxin Wu
(74) *Attorney, Agent, or Firm* — Maginot, Moore & Beck LLP (57) ABSTRACT

A method of generating a dependence graph, an apparatus, a device, a storage medium and a program product are provided. The method includes: obtaining a hook API used by a function component; obtaining a parameter value of the hook API used by the function component; and generating a dependence graph. The hook API corresponds to a hook node in the dependence graph, the parameter value corre-
(Continued)

sponds to a value node in the dependence graph, and there is a connection relationship between the value node and a corresponding hook node.

12 Claims, 3 Drawing Sheets

(51) Int. Cl.
  *G06F 9/448* (2018.01)
  *G06F 9/54* (2006.01)

(56) References Cited

U.S. PATENT DOCUMENTS

| | | | |
|---|---|---|---|
| 2017/0242837 | A1* | 8/2017 | Bauchot ................ G06F 40/18 |
| 2020/0409780 | A1* | 12/2020 | Balasubramanian ........................ G06F 9/3838 |
| 2021/0026756 | A1* | 1/2021 | Magnezi ............ G06F 11/3612 |

FOREIGN PATENT DOCUMENTS

| | | |
|---|---|---|
| CN | 108037913 A | 5/2018 |
| CN | 110928550 A | 3/2020 |
| CN | 111045678 A | 4/2020 |
| CN | 112925522 A | 6/2021 |

OTHER PUBLICATIONS

Japanese Office Action corresponding to Japanese Patent Application No. 2022-520829, dated Jul. 4, 2023 (3 pages).
McFarlane, Timo. "Managing State in React Applications with Redux." (2019).
Extended European Search Report corresponding to European Patent Application No. 21893117.8, dated May 24, 2023 (10 pages).
English Translation of International Search Report and Written Opinion corresponding to International Patent Application No. PCT/CN2021/115006, dated Dec. 2, 2021 (5 pages).
International Search Report corresponding to International Patent Application No. PCT/CN2021/115006, dated Dec. 2, 2021 (9 pages).
English Machine Translation of CN102054149A. (21 Pages).
English Machine Translation of CN112925522A. (22 Pages).
Zuo-Sai, You and Yong-Jun, Wang. (2012). The Research and Implementation of Mining Technology of Malware Behavior Dependence Graph Based on Dynamic Taint Analysis. A Thesis Submitted in Partial Fulfuillment of the Requirements for the Professional Degree of Master of Engineering in Software Engineering Graduate School of National University of Defense Technology. (63 Pages).
English Translation of Zuo-Sai, You and Yong-Jun, Wang. (2012). The Research and Implementation of Mining Technology of Malware Behavior Dependence Graph Based on Dynamic Taint Analysis. A Thesis Submitted in Partial Fulfuillment of the Requirements for the Professional Degree of Master of Engineering in Software Engineering Graduate School of National University of Defense Technology. (63 Pages).
English Machine Translation of CN108037913A. (26 Pages).
English Machine Translation of CN110928550A. (18 Pages).
English Machine Translation of CN111045678A. (21 Pages).
English Translation of Korean Office Action corresponding to Korean Patent Application No. 10-2022-7029703, dated Jun. 28, 2024 (6 pages).
Korean Office Action corresponding to Korean Patent Application No. 10-2022-7029703, dated Jun. 28, 2024 (5 pages).

* cited by examiner

METHOD AND APPARATUS FOR GENERATING DEPENDENCE GRAPH, DEVICE, STORAGE MEDIUM AND PROGRAM PRODUCT

CROSS-REFERENCE TO RELATED APPLICATION

This application is the U.S. national phase of PCT Application No. PCT/CN2021/115006 filed on Aug. 27, 2021, which claims priority to the Chinese Patent Application No. 202110219222.2 filed in China on Feb. 26, 2021, which is incorporated herein by reference in its entirety.

TECHNICAL FIELD

The present disclosure relates to the field of computer technology, in particular to a computer language technology.

BACKGROUND

Hook Application Programming Interface (API) is an API for organizing a component state in a function component. An analysis on the hook API mainly involves an analysis on a life cycle of the hook API.

SUMMARY

The present disclosure is to provide a method of generating a dependence graph, an apparatus for generating a dependence graph, a device, a storage medium and a program product.

According to one aspect of the present disclosure, a method of generating a dependence graph is provided, including:
  obtaining a hook API used by a function component;
  obtaining a parameter value of the hook API used by the function component; and
  generating the dependence graph, where the hook API corresponds to a hook node in the dependence graph, the parameter value corresponds to a value node in the dependence graph, and there is a connection relationship between the value node and a corresponding hook node.

According to another aspect of the present disclosure, an electronic device is provided, including:
  at least one processor, and
  a memory communicatively connected to the at least one processor;
  where the memory stores instructions executable by the at least one processor, and the instructions, when being executed by the at least one processor, cause the at least one processor to perform the method of generating the dependence graph provided by the present disclosure.

According to yet another aspect of the present disclosure, a non-transitory computer-readable storage medium is provided, storing computer instructions, the computer instruction is to cause a computer to perform the method of generating the dependence graph provided by the present disclosure.

According still yet another aspect of the present disclosure, a computer program product is provided, including a computer program, the computer program, when being executed by a processor, implements the method of generating the dependence graph provided by the present disclosure.

It should be understood that, this summary is not intended to identify key features or essential features of embodiments of the present disclosure, nor is it intended to limit the scope of the present disclosure. Other features of the present disclosure will become more comprehensible with reference to the following description.

BRIEF DESCRIPTION OF THE DRAWINGS

The drawings are provided to facilitate the understanding of the present disclosure, but shall not be construed as a limitation to the present disclosure. In the drawings.

DETAILED DESCRIPTION

The exemplary embodiments of the present disclosure, including numerous details of the embodiments of the present disclosure for a better understanding, will be described in conjunction with the drawings hereinafter, which should be deemed merely as illustrative. Therefore, it should be appreciated by those skilled in the art that various changes and modifications may be made to the described embodiments without departing from the scope and spirit of the present disclosure. Further, for clarity and conciseness, descriptions of known functions and structures are omitted.

Figure 1:
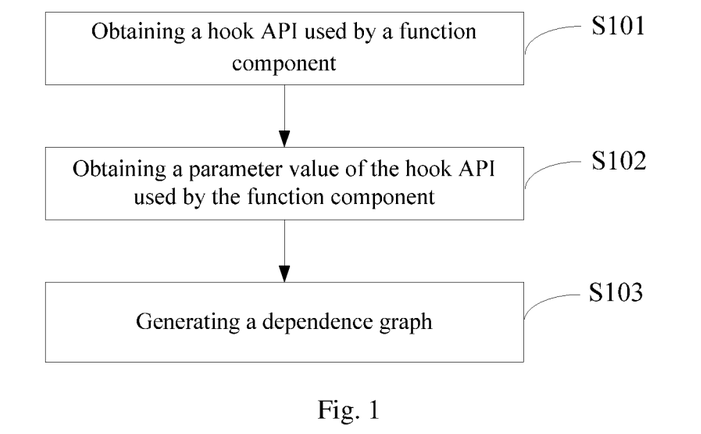
FIG. 1 is a flow chart of a method of generating a dependence graph according to an embodiment of the present disclosure.

Reference is made to FIG. 1, which is a method of generating a dependence graph provided by the present disclosure, as shown in FIG. 1, the method includes the following steps.

In S101, a hook API used by a function component is obtained.

The function component may be a pre-written function component, and corresponding hook APIs used by one or more function components may be obtained.

In addition, the hook API may include all hook APIs used by the function component. It should be appreciated that, the word "use" may also be understood as "call" herein. For example, the hook API may include all hook APIs called by the function component. Further, the hook API may also be referred to as hook for short.

In some embodiments of the present disclosure, the hook API may be a React hook API, which is configured to organize a component state in a React function component.

In addition, in the present disclosure, the hook APIs may be classified on the basis of a holding state, cacheable and holding edge-effect. For example, the hook APIs in the holding state include useState, useReducer, useRef, etc., the hook APIs that are cacheable may include useCallback, useMemo, etc., and the hook APIs that are the holding edge-effect include useEffect, useLayoutEffect, etc.

In an embodiment, an abstract syntax tree of the function component is created, and then the hook API used by the function component is obtained in accordance with the syntax tree. However, the present disclosure is not limited thereto. For example, the hook API used by the function component may also be directly extracted from the function component.

In S102, a parameter value of the hook API used by the function component is obtained.

In this step, the parameter value for each of the hook APIs obtained in S102 may be obtained, and the parameter value includes at least one of an input parameter or a return value identifier. For example, the parameter value for one of some of the hook APIs includes the input parameter and the return value identifier, while the parameter value for one of the other hook APIs may only include at least one of the input parameter or the return value identifier. For example, some of the hook APIs each includes the input parameter only, but does not include the return value identifier, or some of the hook APIs each includes the return value identifier only, but does not include the input parameter.

In S103, the dependence graph is generated. The hook API corresponds to a hook node in the dependence graph, the parameter value corresponds to a value node in the dependence graph, and there is a connection relationship between the value node and a corresponding hook node.

In this step, each of the hook APIs obtained in S102 corresponds to one hook node in the dependence graph. Specifically, a corresponding hook node is generated for each of the hook APIs. In addition, each of the parameter values obtained in S102 corresponds to one value node. For example, corresponding value nodes are generated for each of input parameters and each of identifiers of the return value.

The sentence that there is the connection relationship between the value node and the corresponding hook node may refer to that, there are an edge connecting a value node corresponding to an input parameter to a hook node of a hook API corresponding to the input parameter, or there is an edge connecting a hook node of a hook API to a value node corresponding to a return value identifier for the hook API. Through the connection relationship between the value node and the hook node, the dependence between the hook API and the input parameter, and/or, between the hook API and the return value identifier can be accurately represented.

In the generated dependence graph of the present disclosure, because the hook API(s) constitutes the hook node(s) in the dependence graph, and the parameter value(s) of the hook API(s) constitutes the value node(s) in the dependence graph, the relationship among the hook node(s) and the value node(s) can be presented through the dependence graph, which can help a developer to perform the code programming using the hook API(s) in a more convenient manner, thereby improving a guiding effect on the code programming, and thus, helping the developer to improve the code quality.

Figure 2:
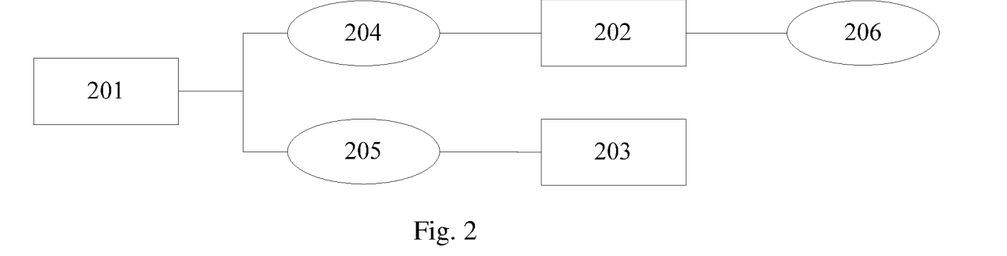
FIG. 2 is a schematic diagram showing a dependence graph according to an embodiment of the present disclosure.

For example, an example in which the hook APIs used by the function component include three APIs, that is, useState, useCallback and useEffect, is taken for illustration. In the function component, the return value identifier of useState may include count and setCount, the input parameter of useCallback may include count, the return value identifier of useCallback may include onLick, and the input parameter of useEffect may include setCount.

In this regard, with respect to the function component, the hook APIs obtained in S101 include useState, useCallback and useEffect, and a dependence graph as shown in FIG. 2 may be generated, where the numerals 201, 202 and 203 represent three hook APIs, i.e., useState, useCallback and useEffect, respectively, and the numerals 204, 205 and 206 represent three parameter values, i.e., count, setCount and onLick, respectively.

It should be appreciated that the above description only takes a simple function component as an example. In practice, the function component may include more hook APIs, as well as more complicated input parameters and return value identifiers.

In an alternative embodiment of the present disclosure, the method further includes:
  in a case that the hook API used by the function component includes a customized hook API, performing a recursive analysis on the customized hook API to obtain an atomic hook API directly; and
  in a case that there is another hook API in addition to the atomic hook API obtained through the recursive analysis, obtaining a parameter value of the atomic hook API, and obtaining a parameter value of the other hook API in addition to the atomic hook API obtained through the recursive analysis;
  where the dependence graph further includes a hook node corresponding to the atomic hook API, a hook node corresponding to the other hook API, a value node corresponding to the parameter value of the atomic hook API and a value node corresponding to the parameter value of the other hook API, and there is a connection relationship between each value node and a corresponding hook node.

The customized hook API refers to a hook API defined by a developer on the basis of an atomic hook provided by React. The other hook API refer to one or more hook APIs between the customized hook API and the atomic hook API.

In some embodiments, the function component may include one or more customized hook APIs, and the above procedure may be performed with respect to each customized hook API.

Similarly, the parameter value may include at least one of the input parameter and the return value identifier. In addition, the parameter values for different hook APIs may be same or different.

In these embodiments, through the recursive analysis, various hook APIs involved in the function component may be obtained, such that the dependence graph can present the dependence among the various hook APIs, thereby further improving the guiding effect of the dependence graph.

It should be noted that if merely the atomic hook API is obtained through the recursive analysis, then merely a hook node of the atomic hook API, a corresponding value node(s) as well as a connection relationship between the hook node and the value node(s) may be added.

In an alternative embodiment, the method further includes:
  in a case that the dependence graph includes a target value node of a new identifier capable of being obtained through an expression, generating a value node corresponding to the new identifier in the dependence graph, and establishing a connection relationship between the target value node and the value node of the new identifier.

The target value node of the new identifier capable of being obtained through the expression refers to, a new identifier may be obtained in accordance with an identifier corresponding to a value node and the expression. The new identifier may be obtained by a certain input parameter identifier or a certain return value identifier using an expression, a value node corresponding to said input parameter or the return value identifier may be the target value node. For example, the certain input parameter identifier or the certain return value identifier may serve as a variable for another identifier.

In this embodiment, through generating the value node of the new identifier and the connection relationship thereof, the dependence graph is enabled to present the dependence among various value nodes, thereby further improving the guiding effect of the dependence graph.

In an alternative embodiment, the method further includes:

obtaining an extensible markup language (XML) expression of a top level of the function component;

generating a component node corresponding to the XML expression of the top level in the dependence graph; and in a case that the XML expression of the top level includes a target XML expression referring to an identifier of a value node in the dependence graph, establishing a connection relationship between the target XML expression and the corresponding value node in the dependence graph.

The XML expression may be a JSX expression.

The obtaining the XML expression of the top level of the function component may include: obtaining the XML expression of the top level of the function component through the syntax tree of the function component.

The generating the component node corresponding to the XML expression of the top level in the dependence graph may include: generating component nodes corresponding to all of or a part of XML expressions in relation to XML expressions of all top levels in the dependence graph, where each XML expression corresponds to one component node.

Figure 3:
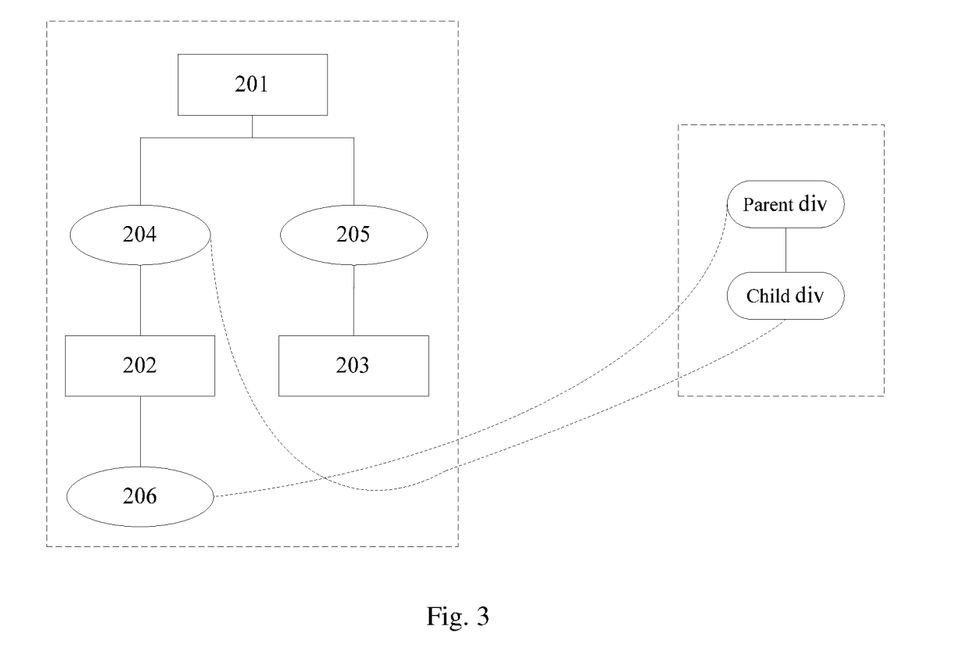
FIG. 3 is a schematic diagram showing another dependence graph according to an embodiment of the present disclosure.

In addition, the generating the component node corresponding to the XML expression of the top level in the dependence graph may include: generating a relationship graph among component nodes separately in the dependence graph, e.g., a relationship graph between a parent component node and a child component node, so as to create a forest map among the component nodes. After creating the forest map, the connection relationship between the target XML expression and the corresponding value node is created. For example, as shown in FIG. 3, a left diagram of FIG. 3 is the dependence graph generated in S103, a right diagram of FIG. 3 is the created forest map, and each dotted line connecting the two diagrams represents a connection relationship between the target XML expression and the corresponding value node.

In this embodiment, through the connection relationship between the target XML expression and the corresponding value node, the dependence among the value nodes for the XML expressions can be presented through the dependence graph, thereby further improving the guiding effect of the dependence graph.

Alternatively, the generating the component node corresponding to the XML expression of the top level in the dependence graph includes:

simplifying a syntax tree of the XML expression of the top level to obtain XML expression of the at least one predetermined level, and generating a component node corresponding to the XML expression of the at least one predetermined level in the dependence graph.

The simplifying the syntax tree of the XML expression of the top level may include simplifying XML expressions in the syntax tree of the XML expression of the top levels and merely reserving the XML expression(s) of the at least one predetermined level as the component node(s). The at least one predetermined level includes a child level and/or a grandchild level, i.e., merely the XML expression of the child level and/or the XML expression of the grandchild level reserved as the component nodes.

In this embodiment, through simplifying the syntax tree of the XML expression of the top level, merely the component node(s) for important level(s) is reserved in the dependence graph, thereby simplifying the dependence graph, and improving a displaying effect of the dependence graph.

It should be further noted that, the following effects will be achieved through the dependence graph in the embodiments of the present disclosure.

A hook node with an out-degree of 0 in the dependence graph may be definitely determined as a hook API or a component node having no return value.

The quantity of connected subgraphs in the dependence graph is determined as the quantity of groups of sub-components whose states are coupled to each other during the operation.

If there is no hook node in the holding state in a certain path of the dependence graph, that path is cacheable.

If two component nodes in the dependence graph are in the same connected subgraph, and are able to be coupled each other logically, the developer may add a common parent component for components corresponding to the two component nodes, and behaviors of the two child-components are packaged into one component, so as to differentiate them from a component in the other connected subgraph.

If two component nodes in the dependence graph are in the same connected subgraph, but should not be coupled to each other logically, the developer may decouple two child-components corresponding to the two component nodes from each other by splitting in accordance with the state, so as to prevent the adverse impact on the component reusability in future.

For a cacheable path in the dependence graph, the developer may optimize the component caching actions including but not limited to React.memo, so as to achieve more performance gain.

For a non-cacheable path in the dependence graph, the developer may pay attention to whether the hook API(s) in the holding state in that path can be further split in accordance with the state, thereby attempting to add a cacheable path.

A developer who newly participates in a project may rapidly understand the state of the component through the dependence graph, which enable the developer to be familiar with a complicated project rapidly and efficiently.

With respect to dependence graphs for different function components, a common mode(s) and a common path(s) in these dependence graphs may be found through data analysis, and as a result, a code abstraction can be performed on the common mode, thereby improving the code reusability.

Figure 4:
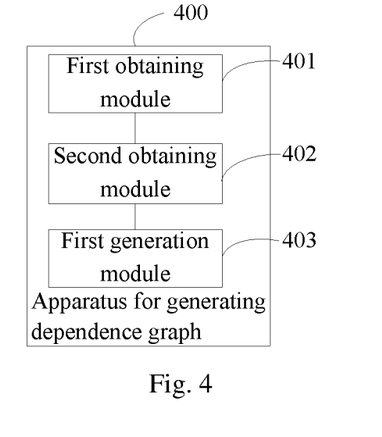
FIG. 4 is a schematic diagram showing an apparatus for generating a dependence graph according to an embodiment of the present disclosure.

Reference is made to FIG. 4, which is an apparatus 400 for generating a dependence graph provided by the present disclosure. As shown in FIG. 4, the apparatus 400 for generating the dependence graph includes:

a first obtaining module 401, configured to obtain a hook API used by a function component;

a second obtaining module 402, configured to obtain a parameter value of the hook API used by the function component; and a first generation module 403, configured to generate a dependence graph, where the hook API corresponds to a hook node in the dependence graph, the parameter value corresponds to a value node in the dependence graph, and there is a connection relationship between the value node and a corresponding hook node.

Figure 5:
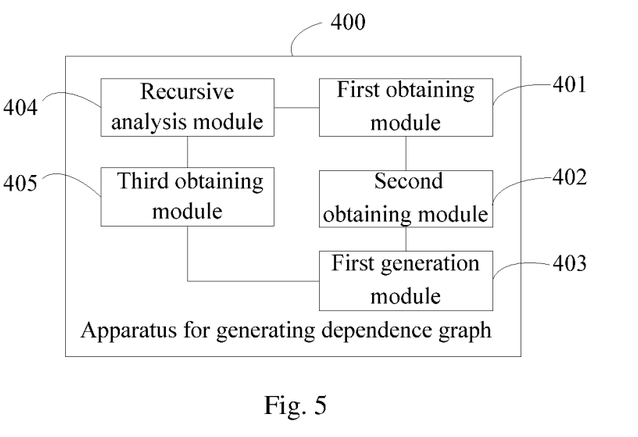
FIG. 5 is a schematic diagram showing another apparatus for generating a dependence graph according to an embodiment of the present disclosure.

Alternatively, as shown in FIG. 5, the apparatus further includes:

a recursive analysis module 404, configured to, in a case that the hook API used by the function component includes a customized hook API, perform a recursive analysis on the customized hook API, to obtain an atomic hook API directly; and a third obtaining module 405, configured to, in a case that there is another hook API in addition to the atomic hook API obtained through the recursive analysis, obtain a parameter value of the atomic hook API, and obtain a parameter value of the other hook API in addition to the atomic hook API obtained through the recursive analysis;

where the dependence graph further includes:

a hook node corresponding to the atomic hook API, a hook node corresponding to the other hook API, a value node corresponding to the parameter value of the atomic hook API and a value node corresponding to the parameter value of the other hook API, and there is a connection relationship between each value node and the corresponding hook node.

Figure 6:
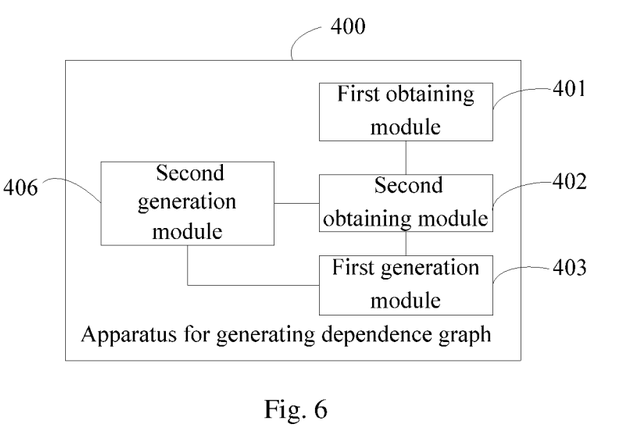
FIG. 6 is a schematic diagram showing yet another apparatus for generating a dependence graph according to an embodiment of the present disclosure.

Alternatively, as shown in FIG. 6, the apparatus further includes:

a second generation module 406, configured to, in a case that the dependence graph includes a target value node of a new identifier capable of being obtained through an expression, generate a value node corresponding to the new identifier in the dependence graph, and establish a connection relationship between the target value node and the value node of the new identifier.

Figure 7:
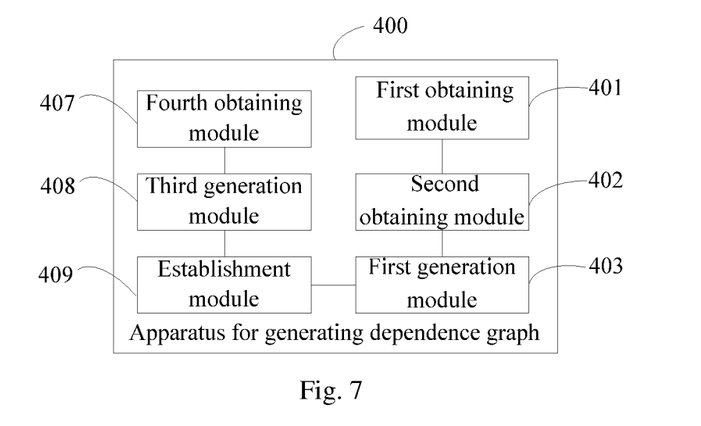
FIG. 7 is a schematic diagram showing still yet another apparatus for generating a dependence graph according to an embodiment of the present disclosure.

Alternatively, as shown in FIG. 7, the apparatus further includes:

a fourth obtaining module 407, configured to obtain an XML expression of a top level of the function component;

a third generation module 408, configured to generate a component node corresponding to the XML expression of the top level in the dependence graph; and an establishment module 409, configured to, in a case that the XML expression of the top level includes a target XML expression referring to an identifier of a value node in the dependence graph, establish a connection relationship between the target XML expression and the corresponding value node in the dependence graph.

Alternatively, the third generation module is further configured to simplify a syntax tree of the XML expression of the top level to obtain an XML expression of at least one predetermined level, and generate a component node in the dependence graph by using the XML expression of the at least one predetermined level.

The present disclosure further provides, in embodiments of the present disclosure, an electronic device, a computer-readable storage medium and a computer program product.

Figure 8:
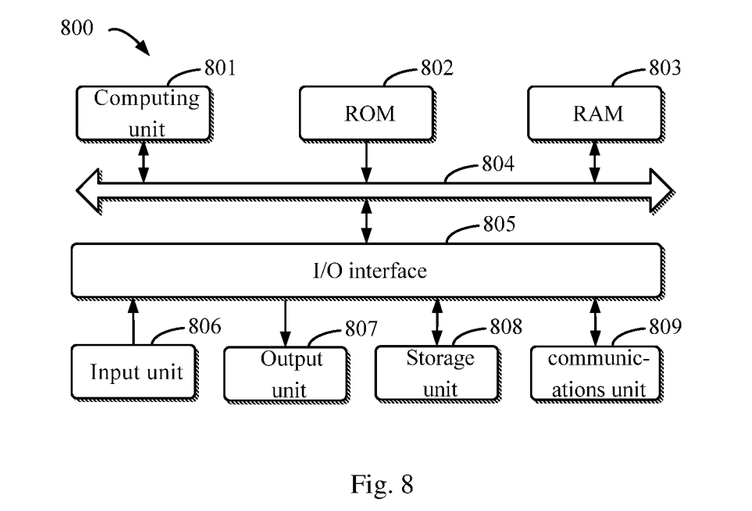
FIG. 8 is a block diagram of an electronic device for implementing the method according to an embodiment of the present disclosure.

FIG. 8 is a schematic block diagram of an exemplary electronic device 800 for implementing embodiments of the present disclosure. The electronic device is intended to represent all kinds of digital computers, such as a laptop computer, a desktop computer, a work station, a personal digital assistant, a server, a blade server, a main frame or other suitable computers. The electronic device may also represent all kinds of mobile devices, such as a personal digital assistant, a cell phone, a smart phone, a wearable device and other similar computing devices. The components shown herein, their connections and relationships, and their functions, are meant to be exemplary only, and are not meant to limit implementations of the present disclosure described and/or claimed herein.

As shown in FIG. 8, the electronic device 800 includes a computing unit 801 configured to execute various actions and processes in accordance with a computer program stored in a read only memory (ROM) 802, or a computer program loaded into a random access memory (RAM) 803 from a storage unit 808. Various programs and data desired for the operation of the electronic device 800 may also be stored in the RAM 803. The computing unit 801, the ROM 802 and the RAM 803 may be connected to each other via a bus 804. In addition, an input/output (I/O) interface 805 may also be connected to the bus 804.

Multiple components in the electronic device 800 are connected to the I/O interface 805. The multiple components include: an input unit 808, e.g., a keyboard, a mouse and the like; an output unit 808, e.g., various types of displayers, loudspeakers, and the like; a storage unit 808, e.g., a magnetic disk, an optic disk and the like; and a communications unit 809, e.g., a network card, a modem, a wireless communications transceiver, and the like. The communications unit 809 allows the electronic device 800 to exchange information/data with other devices through a computer network such as Internet and/or other telecommunications networks.

The computing unit 801 may be any general purpose and/or dedicated processing components having a processing and computing capability. Some examples of the computing unit 801 include, but are not limited to: a central processing unit (CPU), a graphic processing unit (GPU), various dedicated artificial intelligence (AI) computing chips, various computing units running a machine learning model algorithm, a digital signal processor (DSP), and any suitable processor, controller, microcontroller, etc. The computing unit 801 carries out the aforementioned methods and processes, e.g., the method of generating the dependence graph. For example, in some embodiments of the present disclosure, the method of generating the dependence graph may be implemented as a computer software program tangibly embodied in a machine readable medium such as the storage unit 808. In some embodiments, all or a part of the computer program may be loaded and/or installed into the electronic device 800 through the ROM 802 and/or the communications unit 809. When the computer program is loaded into the RAM 803 and executed by the computing unit 801, one or more steps of the foregoing method of generating the dependence graph may be implemented. Optionally, in some other embodiments of the present disclosure, the computing unit 801 may be configured to implement the method of generating the dependence graph in any other suitable manner (e.g., by means of a firmware).

Various implementations of the aforementioned systems and techniques may be implemented in a digital electronic circuit system, an integrated circuit system, a field-programmable gate array (FPGA), an application specific integrated circuit (ASIC), an application specific standard product (ASSP), a system on chip (SOC), a complex programmable logic device (CPLD), computer hardware, firmware, software, and/or a combination thereof. The various implementations may include an implementation using one or more computer programs. The one or more computer programs may be executed and/or interpreted on a programmable system including at least one programmable processor. The programmable processor may be a dedicated or general purpose programmable processor, which may receive data and instructions from a storage system, at least one input device and at least one output device, and may transmit data and instructions to the storage system, the at least one input device and the at least one output device.

Program codes for implementing the methods of the present disclosure may be written by any combination of one or more programming languages. These program codes may be provided to a processor or controller of a general purpose computer, a special purpose computer, or other programmable data processing device, such that the program codes, when being executed by the processor or controller, cause the functions/operations specified in the flow chart and/or block diagram to be implemented. The program codes may be executed entirely on a machine, partially on the machine, partially on the machine and partially on a remote machine as a standalone software package, or entirely on the remote machine or server.

In the context of the present disclosure, the machine readable medium may be a tangible medium, and may include or store a program used by an instruction executing system, device or apparatus, or a program used in conjunction with the instruction executing system, device or apparatus. The machine readable medium may be a machine readable signal medium or a machine readable storage medium. The machine readable medium includes, but is not limited to: an electronic, magnetic, optical, electromagnetic, infrared, or semiconductor system, device or apparatus, or any suitable combination thereof. A more specific example of the machine readable storage medium includes: an electrical connection based on one or more wires, a portable computer disk, a hard disk, a random access memory (RAM), a read only memory (ROM), an erasable programmable read only memory (EPROM or flash memory), an optic fiber, a portable compact disc read only memory (CD-ROM), an optical storage device, a magnetic storage device, or any suitable combination thereof.

To provide an interaction with a user, the system and technique described herein may be implemented on a computer. The computer is provided with a display device (for example, a cathode ray tube (CRT) or liquid crystal display (LCD) monitor) for displaying information to the user, a keyboard and a pointing device (for example, a mouse or a track ball). The user may provide an input to the computer through the keyboard and the pointing device. Other kinds of devices may be provided for the interaction with the user, for example, a feedback provided to the user may be any manner of sensory feedback (e.g., visual feedback, auditory feedback, or tactile feedback); and the input from the user may be received by any means (including sound input, voice input, or tactile input).

The system and technique described herein may be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the system and technique described hereby), or any combination of such back-end, middleware, or front-end components. The components of the system can be interconnected by any form or medium of digital data communications (e.g., a communications network). Examples of communications networks include a local area network (LAN), a wide area network (WAN) and the Internet.

The computer system can include a client and a server. The client and server are generally remote from each other and generally interact through the communications network. The relationship of client and server arises by virtue of computer programs running on respective computers and having a client-server relationship to each other.

It should be appreciated that, all forms of processes shown above may be used, and steps thereof may be reordered, added or deleted. For example, steps set forth in the present disclosure may be performed in parallel, performed sequentially, or performed in a different order, as long as the expected result of the technical solution of the present disclosure can be achieved, and there is no limitation in this regard.

The foregoing detailed description constitutes no limitation to the scope of the present disclosure. It is appreciated by those skilled in the art, various modifications, combinations, sub-combinations and replacements may be made according to design requirements and other factors. Any modifications, equivalent replacements and improvements made without departing from the spirit and principle of the present disclosure shall be deemed as falling within the scope of the present disclosure.

What is claimed is:

1. A method of generating a dependence graph, comprising:
    obtaining a hook application programming interface (API) used by a function component;
    obtaining a parameter value of the hook API used by the function component; and
    generating the dependence graph, wherein the hook API corresponds to a hook node in the dependence graph, the parameter value of the hook API corresponds to a value node in the dependence graph, and there is a connection relationship between the value node and a corresponding hook node;
    wherein the method further comprises:
    in a case that the hook API used by the function component comprises a customized hook API, performing a recursive analysis on the customized hook API to obtain an atomic hook API directly; and
    in a case that there is a further hook API in addition to the atomic hook API obtained through the recursive analysis, obtaining a parameter value of the atomic hook API, and obtaining a parameter value of the further hook API in addition to the atomic hook API obtained through the recursive analysis,
    wherein the dependence graph further comprises:
    a hook node corresponding to the atomic hook API, a hook node corresponding to the further hook API, a value node corresponding to the parameter value of the atomic hook API and a value node corresponding to the parameter value of the further hook API, and there is a connection relationship between each value node and a corresponding hook node.

2. The method according to claim 1, further comprising:
in a case that the dependence graph comprises a target value node of a new identifier capable of being obtained through an expression, generating a value node corresponding to the new identifier in the dependence graph, and establishing a connection relationship between the target value node and the value node of the new identifier.

3. The method according to claim 1, further comprising:
obtaining an extensible markup language (XML) expression of a top level of the function component;
generating a component node corresponding to the XML expression of the top level in the dependence graph; and
in a case that the XML expression of the top level comprises a target XML expression referring to an identifier of a value node in the dependence graph, establishing a connection relationship between the target XML expression and a corresponding value node in the dependence graph.

4. The method according to claim 3, wherein generating the component node corresponding to the XML expression of the top level in the dependence graph comprises:
simplifying a syntax tree of the XML expression of the top level to obtain an XML expression of at least one predetermined level, and generating a component node corresponding to the XML expression of the at least one predetermined level in the dependence graph.

5. An electronic device, comprising:
at least one processor; and
a memory communicatively connected to the at least one processor, wherein the memory is configured to store instructions executable by the at least one processor, and the instructions, when being executed by the at least one processor, cause the at least one processor to perform:
obtaining a hook application programming interface (API) used by a function component;
obtaining a parameter value of the hook API used by the function component; and
generating the dependence graph, wherein the hook API corresponds to a hook node in the dependence graph, the parameter value of the hook API corresponds to a value node in the dependence graph, and there is a connection relationship between the value node and a corresponding hook node;
wherein the instructions, when being executed by the at least one processor, cause the at least one processor to further perform:
in a case that the hook API used by the function component comprises a customized hook API, performing a recursive analysis on the customized hook API to obtain an atomic hook API directly; and
in a case that there is a further hook API in addition to the atomic hook API obtained through the recursive analysis, obtaining a parameter value of the atomic hook API, and obtaining a parameter value of the further hook API in addition to the atomic hook API obtained through the recursive analysis,
wherein the dependence graph further comprises:
a hook node corresponding to the atomic hook API, a hook node corresponding to the further hook API, a value node corresponding to the parameter value of the atomic hook API and a value node corresponding to the parameter value of the further hook API, and there is a connection relationship between each value node and a corresponding hook node.

6. The electronic device according to claim 5, wherein the instructions, when being executed by the at least one processor, cause the at least one processor to further perform:
in a case that the dependence graph comprises a target value node of a new identifier capable of being obtained through an expression, generating a value node corresponding to the new identifier in the dependence graph, and establishing a connection relationship between the target value node and the value node of the new identifier.

7. The electronic device according to claim 5, wherein the instructions, when being executed by the at least one processor, cause the at least one processor to further perform:
obtaining an extensible markup language (XML) expression of a top level of the function component;
generating a component node corresponding to the XML expression of the top level in the dependence graph; and
in a case that the XML expression of the top level comprises a target XML expression referring to an identifier of a value node in the dependence graph, establishing a connection relationship between the target XML expression and a corresponding value node in the dependence graph.

8. The electronic device according to claim 7, wherein generating the component node corresponding to the XML expression of the top level in the dependence graph comprises:
simplifying a syntax tree of the XML expression of the top level to obtain an XML expression of at least one predetermined level, and generating a component node corresponding to the XML expression of the at least one predetermined level in the dependence graph.

9. A non-transitory computer-readable storage medium, storing computer instructions, wherein the computer instructions, when being executed by a computer, cause the computer to perform:
obtaining a hook application programming interface (API) used by a function component;
obtaining a parameter value of the hook API used by the function component; and
generating the dependence graph, wherein the hook API corresponds to a hook node in the dependence graph, the parameter value of the hook API corresponds to a value node in the dependence graph, and there is a connection relationship between the value node and a corresponding hook node;
wherein the computer instructions, when being executed by the computer, cause the computer to further perform:
in a case that the hook API used by the function component comprises a customized hook API, performing a recursive analysis on the customized hook API to obtain an atomic hook API directly; and
in a case that there is a further hook API in addition to the atomic hook API obtained through the recursive analysis, obtaining a parameter value of the atomic hook API, and obtaining a parameter value of the further hook API in addition to the atomic hook API obtained through the recursive analysis,
wherein the dependence graph further comprises:
a hook node corresponding to the atomic hook API, a hook node corresponding to the further hook API, a value node corresponding to the parameter value of the atomic hook API and a value node corresponding to the parameter value of the further hook API, and there is a connection relationship between each value node and a corresponding hook node.

10. The storage medium according to claim 9, wherein the computer instructions, when being executed by the computer, cause the computer to further perform:
in a case that the dependence graph comprises a target value node of a new identifier capable of being obtained through an expression, generating a value node corresponding to the new identifier in the dependence graph, and establishing a connection relationship between the target value node and the value node of the new identifier.

11. The storage medium according to claim 9, wherein the computer instructions, when being executed by the computer, cause the computer to further perform:
   obtaining an extensible markup language (XML) expression of a top level of the function component;
   generating a component node corresponding to the XML expression of the top level in the dependence graph; and
   in a case that the XML expression of the top level comprises a target XML expression referring to an identifier of a value node in the dependence graph, establishing a connection relationship between the target XML expression and a corresponding value node in the dependence graph.

12. The storage medium according to claim 11, wherein generating the component node corresponding to the XML expression of the top level in the dependence graph comprises:
   simplifying a syntax tree of the XML expression of the top level to obtain an XML expression of at least one predetermined level, and generating a component node corresponding to the XML expression of the at least one predetermined level in the dependence graph.

* * * * *